(12) United States Patent
Garg et al.

(10) Patent No.: US 7,660,517 B2
(45) Date of Patent: Feb. 9, 2010

(54) SYSTEMS AND METHODS FOR REDUCING RAIN EFFECTS IN IMAGES

(75) Inventors: Kshitiz Garg, New York, NY (US); Shree K. Nayar, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 516 days.

(21) Appl. No.: 11/377,743

(22) Filed: Mar. 16, 2006

(65) Prior Publication Data

US 2007/0053671 A1    Mar. 8, 2007

Related U.S. Application Data

(60) Provisional application No. 60/662,191, filed on Mar. 16, 2005.

(51) Int. Cl.
*G03B 17/00* (2006.01)
*G03B 7/083* (2006.01)
*G03B 7/093* (2006.01)
*H04N 5/262* (2006.01)

(52) U.S. Cl. .................... 396/77; 396/246; 396/247; 348/239

(58) Field of Classification Search ............ 396/77; 348/239; 382/128
See application file for complete search history.

(56) References Cited

U.S. PATENT DOCUMENTS

| | | | | |
|---|---|---|---|---|
| 3,510,225 | A | 5/1970 | Collis et al. ............... | 356/5.03 |
| 3,519,354 | A | 7/1970 | Brown et al. .............. | 356/342 |
| 3,640,626 | A | 2/1972 | Liskowitz .................. | 356/342 |
| 3,668,674 | A | 6/1972 | Westendorf ................ | 340/515 |
| 3,758,211 | A | 9/1973 | Bateman et al. ............ | 356/340 |
| 5,075,856 | A | 12/1991 | Kneizys et al. ............. | 702/3 |
| 5,239,352 | A | 8/1993 | Bissonnette ................ | 356/5.01 |
| 5,452,723 | A | 9/1995 | Wu et al. .................... | 600/342 |
| 5,884,226 | A | 3/1999 | Anderson et al. ........... | 702/3 |
| 6,459,818 | B1 | 10/2002 | George ...................... | 382/254 |

(Continued)

FOREIGN PATENT DOCUMENTS

EP    1022549 A1    7/2000

OTHER PUBLICATIONS

Cozman, F. et al., "Depth from Scattering", Robotics Institute, Carnegie Mellon University, Pittsburgh, 1997.

(Continued)

*Primary Examiner*—Melissa J Koval
(74) *Attorney, Agent, or Firm*—Byrne Poh LLP

(57) ABSTRACT

Systems and methods for reducing the visibility of rain in acquired images are provided. One or more inputs relating the scene desired to be acquired by the user are used to retrieve camera settings that will reduce the visibility of rain in acquired images. Additionally, features relating to the scene may be automatically determined and used alone, or in combination with user inputs, to retrieve camera settings. The acquired images may be part of a video. Another feature of the invention is its use as a rain gauge. The camera settings are adjusted to enhance the visibility of rain, then one ore more images are acquired and analyzed for the amount and size of raindrops. From this analysis the rain rate can be determined.

16 Claims, 3 Drawing Sheets

U.S. PATENT DOCUMENTS

| | | | | |
|---|---|---|---|---|
| 7,106,327 | B2 | 9/2006 | Narasimhan et al. | 345/426 |
| 2005/0041121 | A1* | 2/2005 | Steinberg et al. | 348/239 |
| 2007/0064987 | A1* | 3/2007 | Esham et al. | 382/128 |

OTHER PUBLICATIONS

Ishimaru, A., 1978, "Limitation on Image Resolution by a Random Medium", Applied Optics, 17(3): 348-352.

Bradley et al., 2000, "Measurements of rainfall properties using long optical path imaging", J. of Atmospheric and Oceanic Technology, 17:761-772.

Kopeika, N., 1981, "General wavelength dependence of imaging through the atmosphere", 20,9.

Schechner et al., 2001, "Instant Dehazing of Images Using Polarization", Proc. CVPR.

Schuster, A., 1905, "Radiation Through A Foggy Atmosphere", The Astrophysical Journal, 21(1):1-22.

Suen, P., et al., 2001, "The Impact of Viewing Geometry on Vision Through the Atmosphere", Electrical and Computer Engineering University of California, IEEE 0-7695-1143-0/01, 454-459.

Narasimhan and Nayar, 2000, "Chromatic framework for vision in bad weather", Proc. CVPR.

Narasimhan and Nayar, 2001, "Removing weather effects from monochrome images", Proc. CVPR.

Oakley et al., 1998, "Improving Image Quality in Poor Visibility Conditions Using a Physical Model for Degradation," IEEE Trans. on Image Processing, Feb. 7, 1998.

K.F. Evans, "The Spherical Harmonics Discrete Ordinate Method for Three-Dimensional Atmospheric Radiative Transfer," The Journal of the Atmospheric Sciences, vol. 55, pp. 429-446, Feb. 1998.

K. Garg and S.K. Nayar, "Detection and Removal of Rain in Videos," IEEE Computer Society Conference on Computer Vision and Pattern Recognition (CVPR'04), 2004.

R. Gunn and G.D. Kinzer, "Terminal Velocity of Fall for Water Droplets in Stagnant Air," J. Metero., 6:243-248, 1949.

E. Habib, W.F. Krajewski, and A. Kruger, "Sampling Errors of Tipping Bucket Rain Gauge Measurements," J. of Hydro. Eng., 6:159, 2001.

M. Loffler-Mang and J. Joss, "An Optical Disdrometer for Measuring Size and Velocity of Hydrometers," J. Atmos. Ocean. Tech., 17:130-139, 2000.

S.G. Narasimhan and S.K. Nayar, "Vision and the Atmosphere," International Journal of Computer Vision, 48 (3):233-254, Aug. 2002.

S.K. Nayar and S.G. Narasimhan, "Vision in Bad Weather," Proceedings of the 7th International Conference on Computer Vision, 1999.

J.P. Oakley and B.L. Satherley, "Improving Image Quality in Poor Visibility Conditions Using a Physical Model for Degradation," IEEE Trans. on Image Processing, Feb. 7, 1998.

M. Schonhuber. H. Urban, J.P. Baptista, W. Randeu, and W. Riedler, "Measurements of Precipitation Characteristics By a New Disdrometer," Proc. Atmos. Phy. And Dyn. in the Analysis and Prognosis of Precipitation Fields, 1994.

K. Tan and J.P. Oakley, "Enhancement of Color Images in Poor Visibility Conditions," Proc. Int'l Conf. Image Processing, vol. 2, Sep. 2000.

T. Wang and R.S. Clifford, "Use of Rainfall-Induced Optical Scintillations to Measure Path-Averaged Rain Parameters," Journal of the Optical Society of America, vol. 65, No. 8, pp. 927-937, 1975.

* cited by examiner

| | Scene Motion | Near Distance | Depth Range | Exposure Time (ms) | F-number |
|---|---|---|---|---|---|
| (a) | slow | close | large | 66 | 14 |
| (b) | slow | close | small | 33 | 4.4 |
| (c) | slow | far | large | 66 | 6 |
| (d) | slow | far | small | 33 | 2 |
| (e) | fast | close | large | X | X |
| (f) | fast | close | small | X | X |
| (g) | fast | far | large | 8 | 6 |
| (h) | fast | far | small | 8 | 2.4 |

Figure 1

SYSTEMS AND METHODS FOR REDUCING RAIN EFFECTS IN IMAGES

CROSS-REFERENCE TO RELATED APPLICATIONS

This application claims the benefit under 35 U.S.C. 119(e) of U.S. Provisional Patent Application No. 60/662,191, filed on Mar. 16, 2005, entitled Methods for Eliminating Rain Effects in Video, which is hereby incorporated by reference herein in its entirety.

STATEMENT REGARDING FEDERALLY SPONSORED RESEARCH OR DEVELOPMENT

The invention disclosed herein was made with U.S. Government support from the National Science Foundation (Award No. IIS-04-12759) and the Office of Naval Research (Award No. N00014-05-1-0188). Accordingly, the U.S. Government may have certain rights in this invention.

FIELD OF THE INVENTION

The present invention relates to the field of computer vision and more specifically to acquiring images in a way that reduces the need for post processing of images.

BACKGROUND OF THE INVENTION

Images acquired by both still and video cameras (or any image acquisition device) can be affected by many factors. This includes both environmental factors, such as weather, and the camera settings. Weather conditions affecting acquired images (both still images and video) can be grouped into static and dynamic weather conditions. Static weather conditions include, cloudiness, fog, haze, and mist. Dynamic weather conditions include many types of precipitation, such as, rain, snow, and hail. Adjusting for both static and dynamic weather conditions is important when taking images outdoors, or in indoor conditions that are similar to outdoor conditions. Indoor conditions may be the existence of smoke from a fire, bright lights part of a studio lighting system, or rain like conditions caused by a sprinkler system.

In addition to environmental factors affecting acquired images, camera settings also affect acquired images. Common camera settings include, the exposure time (or shutter speed), the F-number (or F-stop), and the focus setting (or focal plane). The exposure time is related to how long the film in a traditional camera, or the image sensor in a digital camera, is exposed to incoming light. The F-Number, or F-stop setting, relates to how much light is allowed onto the film or image sensor over the duration of the exposure time. Combined together, the exposure time and the F-number determine how much total light is received by the film or image sensor. The focus setting relates to where the light emitting from the object acquired in the image is focused within the camera.

Both environmental conditions and camera settings affect the performance of computer vision systems. These systems perform better with certain type of images, for example, images containing less noise. Dynamic weather effects can produce a large amount of noise in acquired images reducing the performance of a wide range of computer vision algorithms, such as, feature detection, stereo correspondence, tracking, segmentation, and object recognition.

Various algorithms have been developed for handling static weather effects on image acquisition, however little work has been done on dynamic weather effects.

We have determined that a need exists to reduce the effects of dynamic weather on acquired images without the additional time and expense associated with the use of post processing techniques. We have also determined that a need exists for a rain gauge based on an image acquisition system.

SUMMARY OF THE INVENTION

The systems and methods of the described invention are applicable to both still cameras and video cameras, and they are also applicable to both film and digital cameras. In general, they are applicable to any camera system where camera settings can be adjusted before or while images are being acquired.

We have developed an analytical model for the effects of dynamic weather on acquired images based on the intensity fluctuations caused by such weather. We have also developed a method of adjusting camera settings to reduce the visibility of rain with minimal degradation of the acquired image. This method uses one or more inputs from a user to retrieve settings for an image acquisition device from a data repository. These settings are then used to adjust corresponding camera settings. The input from a user can be, at least, the heaviness of the rainfall, the motion of objects in the scene, the distance of an object to be acquired from the camera, or the near and far distance of the scene. Camera settings that can be adjusted are, at least, the exposure time, the F-number, the focal plane, or the zoom. Although post processing is preferably not required to reduce the visibility of dynamic weather, such as rain, when the present invention is implemented, post-processing may still be applied if camera settings are ineffective, will cause too much image degradation, or to further improve the acquired image. Additionally, automatic detection of certain scene features, such as the heaviness of rainfall, can be performed to partially or totally replace user inputs. With automatic detection of scene features, the entire process of adjusting camera settings can be automated.

A rain gauge may also be provided in accordance with the present invention. Camera settings may be adjusted to enhance the visibility of rain. The acquired images are then analyzed to determine the number and size of raindrops, which can be used to compute the rain rate. This method for measuring rain rate is advantageous in that it provides finer measurements, is inexpensive, and is more portable that other types of rain rate measurement devices.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

FIG. 1 is an example data repository, arranged as a table, for use in the process of adjusting camera settings in accordance with certain embodiments of the present invention.

DETAILED DESCRIPTION OF EMBODIMENTS OF THE INVENTION

Figure 2:
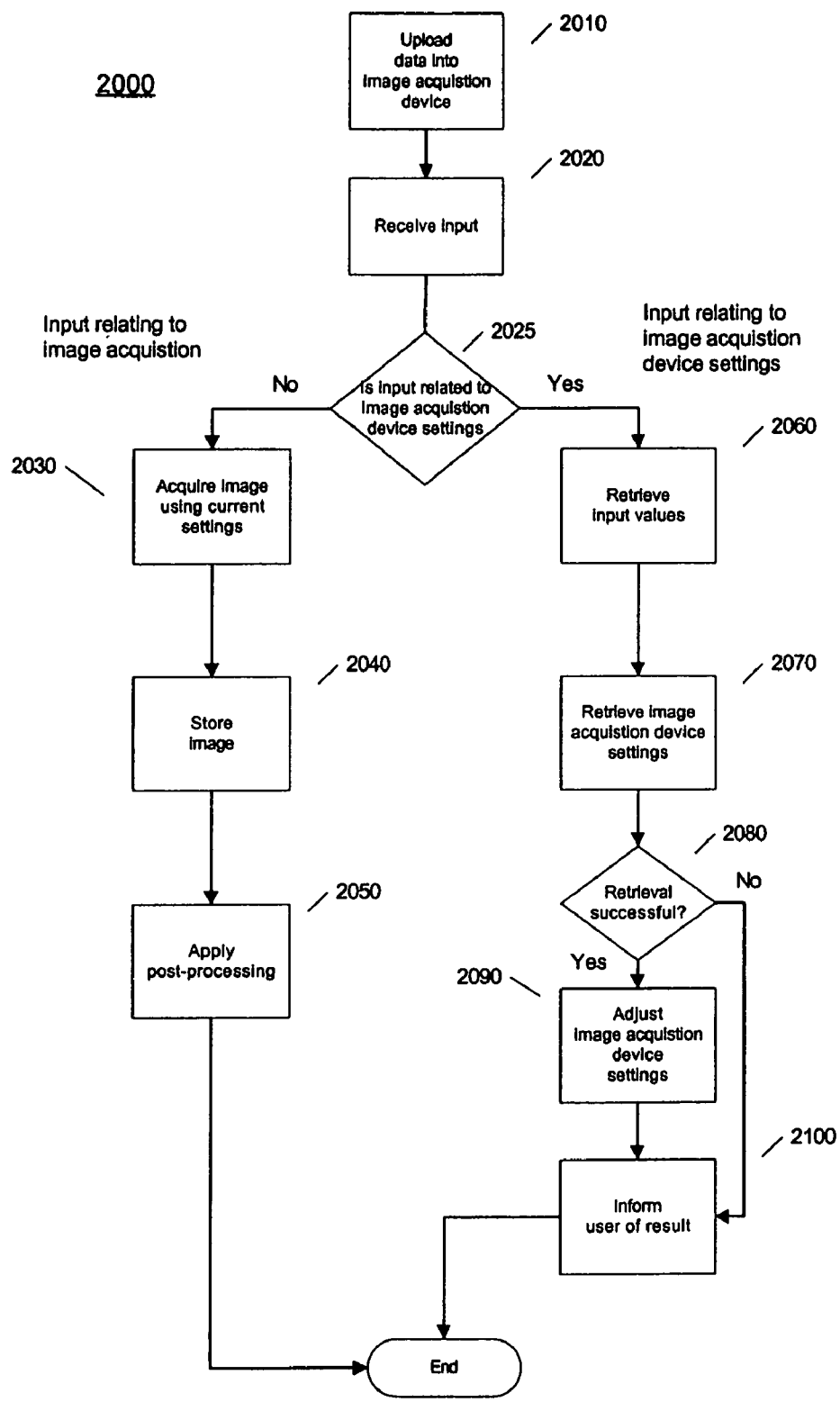
FIG. 2 is an exemplary flow diagram of a first embodiment of the invention which shows details for the process of adjusting camera settings.

An analytical model was developed to model the sharp intensity fluctuations caused by dynamic weather when acquiring images. These sharp fluctuations can reduce the performance of many computer vision algorithms.

Various factors affect the appearance of rain in images, such as, the properties of rain, camera settings, and the scene brightness. Based on an analytical model for rain, it was determined that, first, the visibility of rain increases as the square of the raindrop size. Second, that rain visibility also decreases linearly with the brightness of the background scene. Third, that the high velocity and small size of raindrops make rain visibility highly dependent on camera settings.

Raindrops fall at high velocities compared to the exposure time of a camera. This produces severely motion blurred streaks on images. The following model was developed for the image intensity of rain at a particular pixel:

$$I = k \frac{\pi}{4} \frac{1}{N^2} TL,$$

where I is the Intensity at a pixel, k is the camera gain, N is the F-number, T is the exposure time, and L is the radiance. The camera can be adjusted so that the image intensity does not depend on N and T by setting k to a constant $k_0$ $$k_0 = k \frac{\pi}{4} \frac{T}{N^2}.$$

A model for the intensity changes produced by a defocused raindrop is:

$$\Delta I_d = \frac{w}{w + b_c} \frac{\tau}{T} (L_r - L_b)$$

where the variable w is the width of the focused drop in pixels, $b_c$, is the diameter of the defocused kernel, and $\tau$ is the time that a drop stays within the field of view of a pixel.

A model for the intensity change produced by a motion-blurred raindrop is:

$$\Delta I_d = \frac{1}{b_c + 1} \frac{fa^2}{zv} \frac{1}{T} (L_r - L_b)$$

where v is the velocity of the raindrop, a is the radius of a raindrop, z is the distance of the object from the camera, f is the focal length of the camera, $L_r$ is the brightness of the raindrop, and $L_b$ is the brightness of the background.

From these models, the variance of the intensity change at a pixel due to a volume of rain can be determined. This variance is:

$$\sigma_\varphi(I) = \frac{k_0}{\sqrt{T}} \frac{a^2 \sqrt{\rho}}{\sqrt{v(a)}} (L_r - L_b) \sqrt{G(f, N, z_0)},$$

where $G(f, N, z_0)$ is a function of focal length f, F-number N, and the distance $z_0$ of the focus plane. The variable $\rho$ is the density of raindrops, and $v(a)$ is the velocity of a raindrop based on its size.

From this analytical model camera settings can be derived that reduce the visibility of rain in acquired images. In this model, the visibility of rain decreases as $1/\sqrt{T}$, where T is the exposure time of the camera. Further, the variance of the intensity at a pixel initially increases rapidly with F-number N, and then reaches saturation for higher F-numbers. Regarding the focus plane, a maximum variance is found at the focal plane that keeps the largest possible region of rain in focus.

Turning to FIG. 1, the above observations were used to derive advantageous camera settings and to determine relevant scene features for different types of scenes. Each scene can have any number of scene features, which refer to the overall properties of a scene that are relevant to reducing the visibility to rain. The scene features shown in FIG. 1 are scene motion, near distance, and depth range.

Scene features may be added or removed as criteria for choosing camera settings. Use of more scene features allows for finer control of camera settings to particular situations. For efficiency or other reasons, fewer scene features may also be used. Also, although the various scene features have been shown as binary conditions (slow or fast, close or far) features based on numerical or other scales may be used to introduce finer settings. For instance, scene motion could be specified on a scale of 1 to 10, or near distance could be specified as ranges of distances (1-2 meters, 2-3 meters, etc).

The relevant scene features and examples of effective camera settings for reducing the visibility of rain are summarized in a data table 1000. The data is organized as a table for representative purposes only, and any type of data repository may be used. The actual implementation details of the data repository are not essential to the invention. One of ordinary skill in the art will recognize many other ways of organizing information, involving various tradeoffs between space, search efficiency, and other considerations.

Similarly, the various camera settings available to be adjusted may be increased or decreased depending on the capabilities of the camera. They may also be adjusted based on efficiency reasons, because adjusting many camera settings may take longer than adjusting just one or two. Further, more camera settings require additional storage and effort in deriving the data to populate the data repository.

Turning to the embodiment shown in table 1000, scene motion 1010 describes the motion of objects within the scene. Fast refers to motion such as cars in traffic, while slow would be appropriate for a landscape scene. For example, fast may refer to image motion that is greater than 15 pixels per second. In another example, slow may refer to motion such as people walking at a sufficient distance from the camera. The near distance 1020 refers to the distance of objects from the camera. Close generally means those object within a distance of $(2*f*a)$ from the camera. Where a is the radius of a rain drop in meters and f is the focal length in pixels. A value of close for near distance is generally appropriate for images of peoples, while a value of far for near distance is appropriate for landscapes. The depth range 1030 refers to the depth of range, or field of depth, desired for the acquired image. This is the subjective consideration of the range of distance objects can have from the camera, and still be considered acceptably sharp in the acquired image. The exposure time 1040 refers to how long the film or image sensor should be exposed to light, and the F-number 1050 refers to the amount of light that will be admitted during the exposure time.

The table has been filled in with various examples. For instance, the last row (h) shows one group of settings for reducing the visibility of rain in a traffic scene. An exposure time of 8 milliseconds is necessary to capture fast moving object within the scene. However, the scene is far from the camera. For this situation an F-number of 2.4 works well.

In another example, shown as row (a), a scene of people walking on a sidewalk corresponds to a scene that is close to the camera, and one that requires a large depth range. This large depth range is best met by using a large F-number, such as 14. However, because the motion of the objects in the scene is slow, the exposure time can be increased to 66 milliseconds to reduce the visibility of rain. Rows (e) and (f) correspond to situations where no combination of camera settings are available that can effectively reduce the visibility of rain in the scene with acceptable degradation of the appearance of the image.

FIG. 2, is an exemplary flow diagram of a first embodiment of the invention which shows details for the process of adjusting camera settings 2000, using a table like the one described above with reference to FIG. 1. Overall, the system receives input from a user, uses the input to retrieve camera setting that will reduce the visibility of rain based on the user's input, and then adjusts the camera setting according to the retrieved settings.

At block 2010, data corresponding to that shown in FIG. 1 is uploaded into the camera. This upload may be done through any well known means such as a serial cable, universal serial bus connection, a wireless connection, or a memory card. Alternatively, this data may be installed when the camera is manufactured, and may contain settings considered "optimal" by the camera manufacturer. These settings may be stored in any type of memory, although a non-volatile type of memory, such as EEPROM or flash memory, may be preferred for reduced power consumption.

At block 2020 user input is received. This input may consist of an input directing the camera to acquire an image or to start recording a video. The input may also consist of data from the user describing certain scene features and/or the user's requirements to be used when adjusting the camera settings. These scene features and requirements may correspond to columns 1010, 1020, and 1030 of FIG. 1.

At block 2025, the user input is processed so that appropriate action can be taken based on the input. If the input relates to acquiring images, the method branches to block 2030. However, if the input relates to adjusting camera settings, the method branches to block 2060. Other actions based on the user input have not been shown, for example, setting zoom or flash settings.

At block 2030, an image is actually acquired using the current camera settings. At block 2040, the image is stored into memory as is well known. This may be storage onto any type of memory, both volatile and non-volatile. The image may also be stored onto optical, magnetic, or other removable or non-removable media.

At block 2050, post processing can be applied to the acquired images or video. This post processing can be for any purpose, including the removal of rain. Post processing for the removal of rain may be used when, as described in reference to rows (e) and (f) of FIG. 3, adjusting camera settings cannot effectively reduce the visibility of rain without causing a degradation of image quality. Post processing may also be used to supplement the camera settings, and further reduce the visibility of rain.

At block 2060, the user inputs relating to the camera settings are retrieved. There may be multiple inputs, as necessitated by the number of scene features being used by the camera to retrieve appropriate camera settings. In one embodiment, the input may consist of only a single bit of data indicating whether it is raining in the scene or not. The inputs may be provided by specially adapted physical switches and buttons on the camera, or by software settings, entered using buttons, trackwheels, and other input mechanisms.

Alternatively, these inputs can be stored into profiles, and a user can simply select a particular profile to use. For example, the profile may be for a scene with a single stationary object, of moderate distance, on a lightly raining day. These profiles may be created and stored ahead of time, or may simply be stored when a user particularly likes a certain combination of input, or the inputs correspond to a combination that is frequently used.

At block 2070, the user inputs are used to find the appropriate camera settings in the data repository that was uploaded at block 2010. The method for retrieving these settings will depend on the implementation of the data repository used. For a data repository implemented in a table as shown in FIG. 1, camera settings may be found by searching down the first column until the correct scene feature is found, then searching down the next column for the next scene feature, and so forth.

At block 2080, the results of the data retrieval are evaluated. If the data retrieval is unsuccessful, for example, because there are no stored settings that correspond to the user's input, or because the user's input corresponds to a situation where there are no settings that can reduce the visibility of rain without degrading the image quality, then the user can be notified of this at block 2100 and the method ends. The notification may be an audio or visual indication, such as a sound, a light emitting diode, or a message on a display, notifying the user that the cameras settings are not going to be adjusted. The display may also be used to present additional information in combination with the other mechanisms.

Otherwise, at block 2090, the camera settings are adjusted in a way that corresponds to the setting that are retrieved from the data repository. Further translation of some data may be needed to derive actual camera settings. After the adjustments are made, the user can be notified using an audio or visual method as described above, and the method ends.

Figure 3:
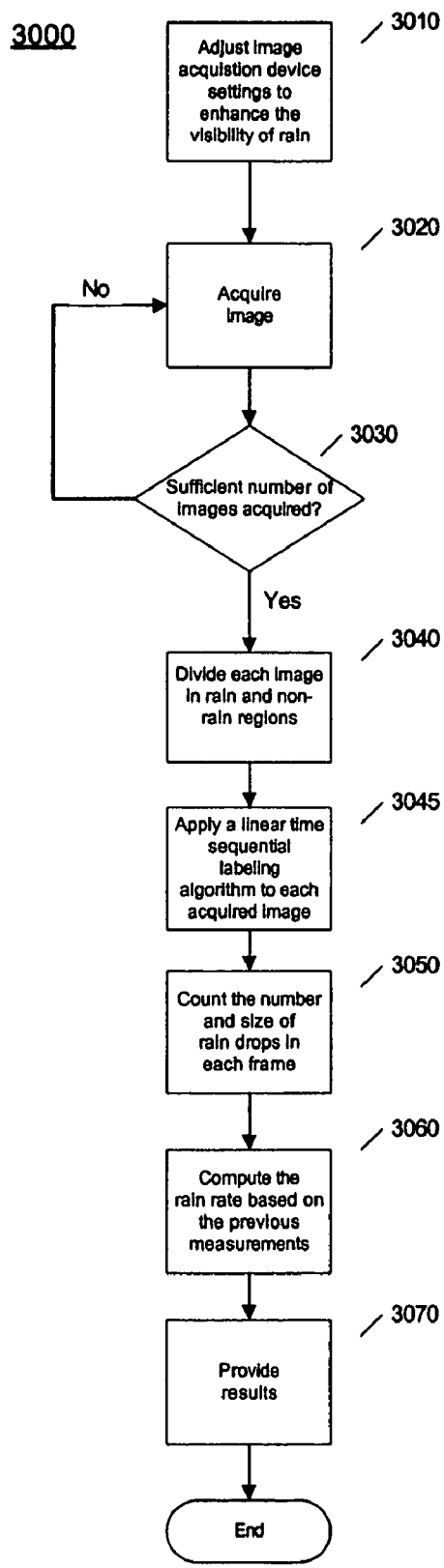
FIG. 3 is an exemplary flow diagram of a second embodiment of the invention which shows details of measuring the rain rate.

FIG. 3 is an exemplary flow diagram of a second embodiment of the invention which shows details of measuring the rain rate. This embodiment of the invention is based on using the analytical model described above in a way that is used to find camera settings that enhance the visibility of rain, instead of reduce the visibility of rain. By enhancing the visibility of rain, the size and number of raindrops can be measured, leading to a measurement of the rain rate.

The method starts at block 3010, where the camera (image acquisition device) settings are adjusted to enhance the visibility of rain. The distance of the focal plane is set to less than $(2*f*a_{min})$ to make the smallest rain drop size visible, where $a_{min}$ is the minimum size of a raindrop. The F-number is set to a small number, and the depth of field is set to a small range.

At block 3020, an image is acquired using the settings entered at block 3010. The acquired frame can be analyzed immediately and/or analyzed concurrently with the acquisition of additional images. Alternatively, the acquired image can be stored for later analysis as shown in FIG. 3.

At block 3030, it is determined whether a sufficient number of images have been acquired to provide an accurate estimate of the rain rate. More images may be required depending on the type of rainfall. The number of frames acquired may also depend on the analysis of previous frames, if such analysis is performed concurrently with the acquisition of additional images.

At block 3040, the acquired images are divided into rain and non-rain regions. This can be done using the methods described in "Detection and Removal of Rain from Videos," by K. Garg and S. K. Nayar, published in the IEEE Conference on Computer Vision and Pattern Recognition, Vol. I, pp. 528-535, June, 2004, which is hereby incorporated by reference herein in its entirety.

At block 3045, a linear time sequential labeling algorithm is applied to each image to obtain the number of raindrops, their size, and their velocity (by measuring the length of rain streaks). This type of algorithm is described by B. K. P. Horn in Robot Vision published by The MIT Press, 1986, which is hereby incorporated by reference herein in its entirety. Defocused rain streaks are removed by rejecting rain streaks that do not satisfy the velocity-size relationship as given by the equation below. This removal of defocused streaks is possible, because defocus primarily affects the width of the rain streaks, not their length. Therefore, the defocus causes an overestimate of the size of the raindrops, but not of their velocity. This disparity between the size and velocity of the raindrop allows the defocused rain streak to be detected and removed.

At block 3050, the number and size of raindrops in each image is determined based on the application of the algorithms of blocks 3040 and 3045.

At block 3060, the rain rate is computed based on the results of block 3050. One formula for computing such a rain rate is:

$$h = \int h(a)da = 3.6*10^6 \frac{4\pi}{3} \int a^3 \rho(a)v(a)da.$$

where a is the radius of a raindrop, ρ(a) is the density of rain, which is derived from the results of block 3050, and v(a) is the velocity of a raindrop, which is a function of raindrop radius. The velocity-size relationship is:

$$v(a)=200\sqrt{a}$$

At block 3070, the results of the computation are provided. This may be through any suitable interface, for example, a liquid crystal display. The results may also be stored internally for later retrieval.

The process described above with reference to FIGS. 2 and 3 can also be made either fully automatic or semi-automatic. To fully automate the process, scene features can be determined automatically instead of relying on user inputs. Scene features may be determined automatically by analyzing acquired images, and/or through the use of other sensors. The automatically detected scene features can then be used to retrieve and adjust camera settings in an analogous manner to using user inputs. By automatically detecting scene features, the entire process for acquiring images with a reduced visibility of rain can be automated, increasing the speed and convenience of the process for a user. A method of automatically detecting rain is presented in "Detection and removal of rain in videos" by K. Garg and S. K. Nayar, published in the 2004 Proceedings of the IEEE Computer Society Conference on Computer Vision and Pattern Recognition, which is hereby incorporated by reference herein in its entirety. Similarly, other scene features, such as the amount of motion of object within a scene, can be detected using motion detection algorithms.

The process can also be made semi-automatic by combining the automatic detection of some scene features, such as the presence of rain, with user inputs relating to scene features. The user inputs can relate to more subjective scene features, such as, the depth range desired. Further, user inputs may be use to supplement or override an automatic determination. For example, an automatic detection algorithm may detect light rain. A user may wish to override this and enter heavy rainfall. In this semi-automatic process, both automatically detected scene features, and user inputs can be used to retrieve appropriate camera settings.

Although the systems and methods described above have been described in the context of still and video cameras, these systems and methods may be used in any device for acquiring images. An implementation of the system may include a memory for storing the data repository of camera settings, and a controller (or microprocessor) for processing user input and retrieving the correct settings. The techniques of the present invention may be integrated into existing microchips used in commercial digital cameras and digital video cameras. A portion of the memory of such devices may be used to store the data repository. The methods of the invention may also be integrated into existing computer vision systems used in a wide variety of commercial and industrial systems—especially those systems required to operate correctly in outdoor environments.

Other embodiments, extensions, and modifications of the ideas presented above are comprehended and within the reach of one versed in the art upon reviewing the present disclosure. Accordingly, the scope of the present invention in its various aspects should not be limited by the examples and embodiments presented above. The individual aspects of the present invention, and the entirety of the invention should be regarded so as to allow for such design modifications and future developments within the scope of the present disclosure. The present invention is limited only by the claims that follow.

What is claimed is:

1. A method for reducing the visibility of rain when acquiring images by adjusting an image acquisition device's settings comprising:
    (a) receiving one or more inputs before acquisition of an image, wherein one input indicates the presence of rain;
    (b) retrieving at least one pre-existing image acquisition device setting from a data repository using the one or more inputs;
    (c) adjusting at least one of an exposure time, an F-number, and a focal length for the image acquisition device according to the at least one setting retrieved from the data repository before acquisition of the image using the image acquisition device; and
    (d) acquiring one or more images using the image acquisition device.

2. The method of claim 1, wherein the one or more inputs further comprise at least one of an input relating to a motion of objects in a scene, a distance of a scene from the image acquisition device, and a depth range.

3. The method of claim 1, wherein one of the one of more inputs corresponds to a rain rate.

4. The method of claim 3, wherein the rain rate is automatically determined.

5. The method of claim 1, wherein the acquiring of one or more images comprises recording a video.

6. The method of claim 5, comprising repeating the receiving of (a), the retrieving of (b), and the adjusting of (c) during the recording of the video.

7. The method of claim 1, further comprising applying post processing to the acquired images.

8. The method of claim 1, wherein one of the one or more inputs is the selection of a profile of previously stored inputs.

9. The method of claim 1, further comprising automatically determining that the input indicates the presence of rain.

10. The method of claim 9, wherein the automatically determining comprises: acquiring at least one image using the image acquisition device; and applying at least one algorithm for detecting rain to the at least one acquired image.

11. The method of claim 10, where the image acquisition device is at least one of a digital camera and a digital video camera.

12. A system for reducing the visibility of rain when acquiring images comprising:
   a memory for storing a data repository containing settings for an image acquisition device; and
   a controller for receiving one or more inputs before acquisition of an image, wherein at least one of the one or more inputs indicates the presence of rain, wherein the controller retrieves at least one pre-existing setting for the image acquisition device from the memory based on the one or more inputs, and wherein the controller adjusts at least one of an exposure time, an F-number, and a focal length for the image acquisition device according to the at least one setting retrieved from the memory before acquisition of the image using the image acquisition device.

13. The system of claim 12, further comprising a display for assisting a user with entering one of the one of more inputs.

14. The system of claim 13, wherein the memory is non-volatile.

15. The system of claim 14, wherein the data repository is a structured as a table.

16. The system of claim 15, wherein the controller is a microprocessor.

* * * * *

UNITED STATES PATENT AND TRADEMARK OFFICE
CERTIFICATE OF CORRECTION

PATENT NO. : 7,660,517 B2  Page 1 of 1
APPLICATION NO. : 11/377743
DATED : February 9, 2010
INVENTOR(S) : Garg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 846 days.

Signed and Sealed this

Thirtieth Day of November, 2010

David J. Kappos
*Director of the United States Patent and Trademark Office*